Sept. 21, 1937.  E. BURGAN  2,093,414
AIRCRAFT CONTROL
Filed July 31, 1934
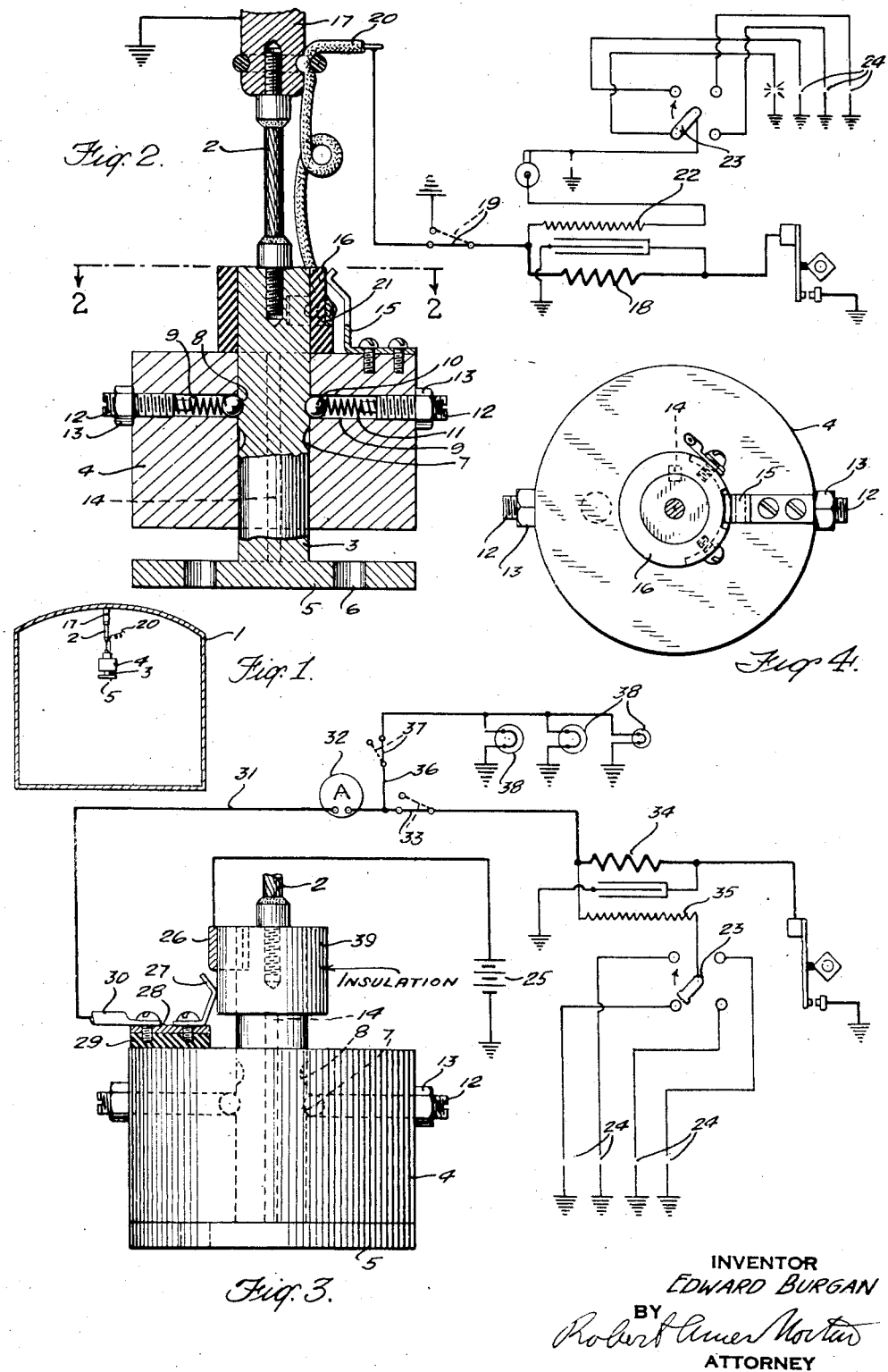
INVENTOR
EDWARD BURGAN
BY
Robert Ames Norton
ATTORNEY Patented Sept. 21, 1937

2,093,414

UNITED STATES PATENT OFFICE 2,093,414

AIRCRAFT CONTROL

Edward Burgan, White Plains, N. Y.

Application July 31, 1934, Serial No. 737,835

4 Claims. (Cl. 200—52)

This invention relates to crash operated electrical controls for aircraft.

It has been proposed in the past to provide airplane landing gear with switches which will turn off the ignition on landing but such devices turn off the ignition on every landing which is not desirable and will not operate in the event of a crash in which the plane does not strike the ground with its landing gear.

According to the present invention, crash operated means are provided which will shut off the ignition of an airplane engine and make or break other desired electrical circuits. These means are operative in crashes occurring from practically any direction and are in no way dependent on contact of the landing gear with the ground. The device is also equally sensitive in all directions which is of great importance because if a device is more sensitive in some directions than in others, it either has to be adjusted to respond to a shock in its least sensitive direction, in which case it is too sensitive in other directions and may operate under conditions where it is not desired to shut off the motor or else if it is adjusted to be sufficiently insensitive in the directions where it responds most readily to shock, the response in the directions of least sensitivity may be inadequate for crashes coming from those directions and which are not of sufficient violence to operate the device although hard enough to cause a danger of fire.

Another important advantage of the present invention is its complete insensitiveness to vibration, which is nearly always present in aircraft. It has been proposed to balance a weight at the end of a crank arm on a knife edge in order to set loose small balloons in the event of a crash. Such a device, if sufficiently sensitive for true crash operation, tends to become displaced by vibration which may cause the device to operate under conditions which are not desired.

While the invention is primarily applicable to aircraft carrying human beings, it is, of course, equally applicable to radio controlled aircraft, such as aerial torpedoes. Such devices are required to explode a firing charge on contact with the target and are particularly effective against relatively expensive units of war material such as battleships. Hitherto aerial torpedoes have been provided with ordinary strikers and detonators which will only operate if a square-head-on collision with the target takes place. The present invention which will respond to a crash shock from any direction, can be used on aerial torpedoes to complete a firing circuit and will operate regardless of the nature of the collision of the torpedo with its target. Thus, for example, an aerial torpedo fired at a battleship will explode even though it should strike a mast or any portion of the ship superstructure with one wing which would not result in detonating the type of aerial torpedo hitherto proposed. The invention will be described more specifically in connection with the control of electrical circuits in aircraft for the transportation of human beings but it is obvious, of course, that the application to aerial torpedoes requires merely the proper connection of electrical circuits.

The present invention consists, in its preferred form, essentially in a pair of metallic or other members of reasonably high specific gravity arranged in the form of a rod passing through a movable annulus. The annulus is preferably provided with friction means which can be adjusted to grip the central rod or member sufficiently tightly in one position so as to prevent movement under ordinary conditions of aircraft operation but which result in displacement of the annular member in the event of a shock of greater magnitude. The rod is attached to the airplane fuselage or other suitable portion of the aircraft through a flexible joint which will permit the assembly to swing in practically any direction so that the shock of a crash from any direction will cause the annular member to respond by moving down on the rod. Suitable electrical contacts are provided on the two members to either make or break electrical circuits depending on the particular type of ignition used in the airplane. Thus, in the case of magnetos, contacts have to be made by the movement of the annular member whereas in battery systems contacts have to be broken.

The particular shape of the inertia operated member is not material to the invention in its broader aspects. The form of annular inertia member sliding on a rod is, however, the cheapest and simplest design and will be described in detail in the drawing. However, other designs such as inertia member moving in a cylinder and the like may be used.

Typical illustrations of the preferred form of invention are shown in the drawing in which Fig. 1 is a diagrammatic section through an airplane body showing the method of attaching the inertia device of the present invention;

Fig. 2 is a vertical section on a larger scale through an inertia device adapted for magneto ignited engines, the figure also showing the electrical circuit;

Fig. 3 is an elevation of inertia device after operation in a crash showing it adapted to an airplane having battery ignition;

Fig. 4 is a horizontal section along the lines 2—2 of Fig. 2.

Fig. 1 shows diagrammatically the location of the crash controlled device. Essentially the fastening is from the fuselage shown diagrammatically as (1) and the inertia operated switch consisting of inner portion (3) and an annular portion (4). The flexible coupling is shown at (2) as a flexible steel cable but may of course be of any other suitable design. The member (3) consists in a cylindrical portion and a flange (5), the latter being provided with one or more holes (6) to permit resetting of the device. The cylindrical portion of the member (3) carries two grooves (7 and 8) and the annular weight (4) is provided with two or more holes (9) tapped at their outer portions and each containing a locking ball (10) in contact with the upper groove (8) (Fig. 2), a spring (11) pressing on the ball and an adjusting screw (12) for varying the pressure of the springs. A lock nut (13) is provided to prevent backing out of the set screw as a result of vibration. A keyway and key (14) is provided to prevent rotation of the annular member about the cylindrical member (3). Rotation might cause the electrical contacts to move out of registry.

For magneto operation as illustrated in Fig. 2, a contact (15) is provided on the annular member (4). In the position shown in Fig. 2 this contact is insulated by pressing on the insulating sleeve (16). The inertia member (4) is at ground potential (i. e. airplane ground that is connected to the metallic portions of the engine) through the flexible cable (2) and the grounded support (17). The low tension winding (18) of the magneto is connected through the manual ignition switch (19) and flexible cable (20) to a contact (21) on the insulator (16). When the motor is operating the switch (19) is in the position shown in heavy lines and the ignition is on, there being the usual circuit from the high tension winding (22) of the magneto through the distributor (23) to the various spark plug gaps (24).

In the event of a crash, the violent shock will cause the annular member (4) to move down on the cylindrical member (3) until the balls lock in lower groove (7) and the annular member contacts with the flange (5). In this position, the spring of the contact (15) makes contact with the metal plate (21) which short-circuits the low tension side of the magneto and therefore turns off the ignition. In normal operation, when it is desired to turn off the ignition the primary circuit of the magneto is grounded by the manual switch (19). Spring tension on the ball (10) is adjusted so that the member (4) will not move under any shocks incident to normal operation of the airplane including the normal shocks of landing. In certain cases where it is desired to shut off the ignition in the case of rough landing even though it is not of the violence which would ordinarily be described as a crash spring tension can be suitably loosened. In such a case it may be desirable to reset the device which can be easily effected by introducing a round rod or even a screw driver blade through the holes (6) in the flange (5) and giving it a few blows with a hammer to move the member (4) up so that the balls will engage with the upper groove (9).

Fig. 3 illustrates the device after a crash has occurred, that is to say, after the member (4) has been forced down so that the balls registered with the lower groove (7). This figure also illustrated the circuit for battery ignition, the battery being shown at (25) with the negative plate grounded. The positive wire runs to a contact (26) on the member (39) which contact connects to a wiper blade (27) screwed into a metallic plate (28) which is in turn carried by the member (4) but insulated therefrom by the insulating block (29). From another contact (30) in this plate a wire (31) runs through the ammeter (32) and manual ignition switch (33) to the low tension winding (34) of the battery ignition circuit. The high tension winding (35) of this circuit connects to the spark plug gaps (24) through the distributor (23). A branch wire (36) runs from the ammeter through the light switch (37) to the navigation lights (38). In the event of a crash the movement of the member (4) breaks the circuit from the battery to all the electrical circuits of the plane not only turning off the ignition but also turning off the lights or other electrical circuits which might cause sparking in the event of a crash.

The circuit illustrations in Fig. 2 and Fig. 3 are of course merely diagrammatic and show the bare essentials of an ordinary ignition and lighting system. In most airplanes the circuits are of course more complicated by switching arrangements, operation of radio instruments and the like. Since, however, the whole of current of the battery passes through the contacts (26) and (27), all circuits are shut off at the same time.

In the case of a magneto ignited engine as shown in Fig. 2 the operation of the device merely shuts off the engine. If a storage battery and lights or other electrical circuits are used in conjunction with a magneto ignited engine, two sets of contacts are carried by the device, one set on one side as in Fig. 2 and the other set as in Fig. 3. This has not been illustrated by separate figure in the drawing as the arrangement is obvious.

It will be apparent that the device of the present invention is equally sensitive to shocks in practically all directions. The theoretical possibility of a crash giving only a single component of motion straight along the flexible cable (2) as when an airplane should fall up-side-down absolutely vertically is a contingency which can practically never occur, as the odds against such a possibility are many millions to one. Any crash that has any reasonable possibility of occurring provides for some forward or sideward motion so that the device of the present invention for all practical purposes can be considered as sensitive to crashes in all directions. Moreover, this sensitivity is equal in all directions because it is determined purely by the amount of spring pressure on the balls registering with the grooves. Thus the operation of the device is equally effective in crashes in all directions or in the case of an aerial torpedo in collisions with the targets in all directions. The device is simple, thoroughly reliable and requires no maintenance to keep it in operating condition. In the preferred embodiment shown in the figures, the device is also resettable so that in the case of a crash which either does not completely incapacitate the plane or where it is desired to utilize the battery of the plane for transmission of radio distress signals the device can be reset without special tools.

In the preferred embodiment round members are used with a keyway and key. This is the simplest and cheapest construction but any other design which will permit controlled movement of two members by reason of inertia from one predetermined position to another can be substituted and it is understood that in its broadest aspects the invention is not limited to the particular mechanical design of the preferred embodiment which is illustrated in the drawing.

What I claim is:

1. A crash operated control for spark ignited internal combustion engine driven aircraft comprising a combination of a round member provided with a flange at its lower end, flexible connecting means connecting said member to the aircraft so as to permit movement of the member in any plane, an annular member fitting on the rounded portion of the first member and capable of moving along the latter under the influence of inertia, friction means holding the annular member from movement on the rounded member in a position out of contact with the flange, said friction means being sufficiently powerful to prevent movement of the annular member under the shocks of normal operation of the aircraft but capable of moving under the shock of a crash from substantially any direction, the two members carrying electrical contacts adapted to change the circuit conditions in the aircraft by the movement of the annular member as a result of a crash.

2. A crash controlled device for spark ignited internal combustion engine driven aircraft comprising the combination of a round member provided with a flange at its lower end, flexible connecting means connecting said member to the aircraft to permit movement of the member in any plane, an annular member surrounding the rounded portion of the first member and capable of movement thereon, two circumferential grooves on the round member, spring pressed balls on the inner surface of the annular member adapted to engage with either groove and to frictionally lock the member against movement when so engaged, electrical contacts carried by the two members and adapted on movement of the annular member from engagement with one groove to engagement with the second groove and with the flange to shut off the ignition of the airplane engine.

3. A device according to claim 2 in which the spring pressure on the balls is adjustable to vary the sensitivity to shock of the device and the members are provided with a keyway and engaging projection to prevent rotation of annular member on the other member.

4. A device according to claim 2 in which the flange is provided with openings permitting the insertion of tools for resetting the device after operation in a crash.

EDWARD BURGAN.